Patented June 14, 1949

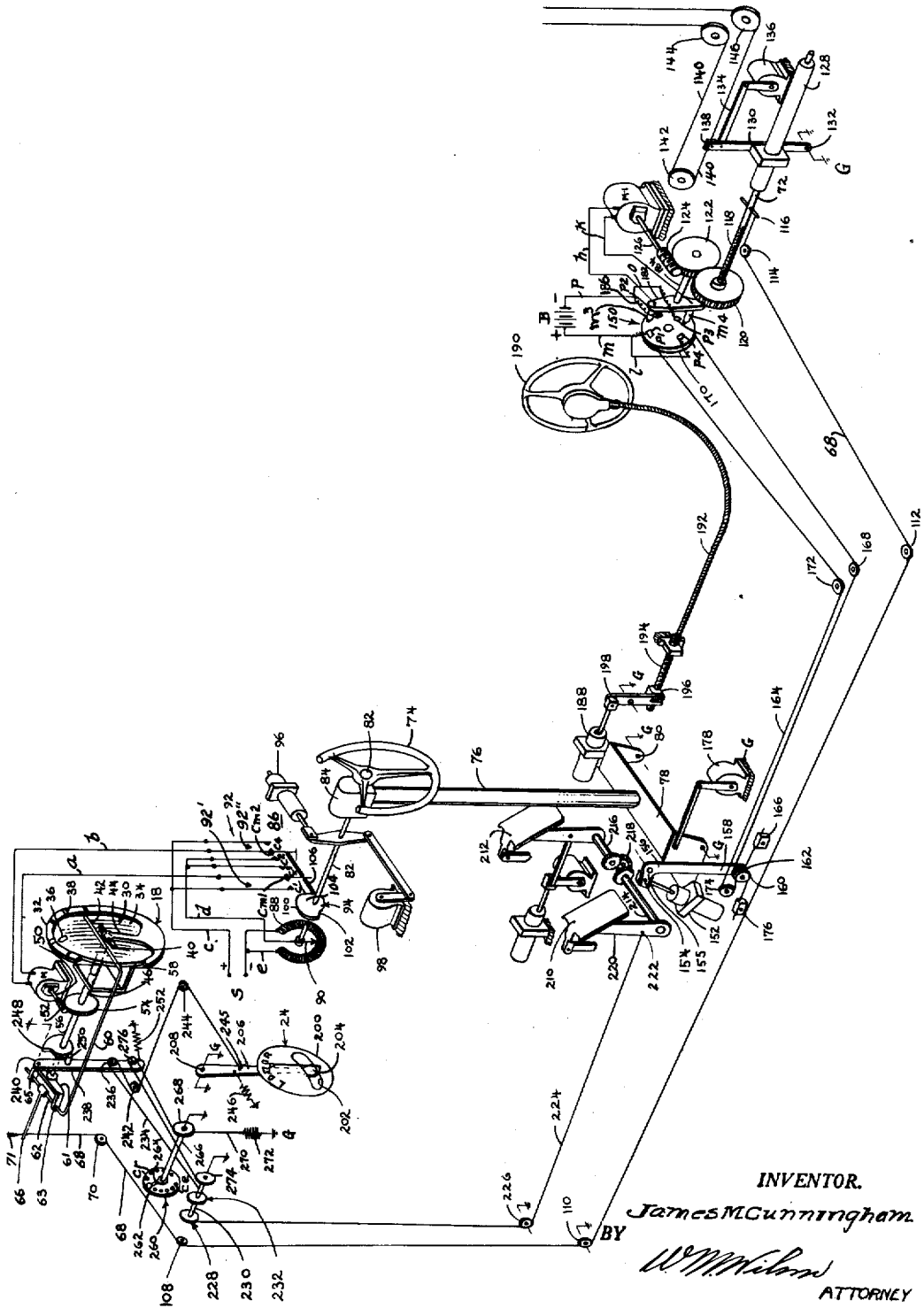

2,472,888

UNITED STATES PATENT OFFICE 2,472,888

APPARATUS FOR TRAINING PILOTS AND OTHER AIRCRAFT PERSONNEL

James M. Cunningham, Endicott, N. Y., assignor to International Business Machines Corporation, New York, N. Y., a corporation of New York Application February 21, 1945, Serial No. 579,009

4 Claims. (Cl. 35—12)

The present invention relates to training apparatus for aircraft personnel and, more particularly, relates to training apparatus of the type disclosed in a co-pending application of George F. Daly, Serial No. 566,804, filed December 6, 1944, for "Apparatus for training bombardiers and other aircraft personnel."

The above mentioned application discloses a training apparatus for bombardiers wherein the bombardier is confronted with conditions which closely simulate those that occur during actual flying and which are intended to produce proficiency in the art of bombing. This apparatus is in the form of a bombing and dead-reckoning trainer which has been designed to duplicate to the utmost degree the flight of an airplane on an actual bombing mission, while at the same time enabling an instructor to observe the bombardier's reactions and give him valuable advice as to his procedure.

The pilot's control station comprising the present invention may be considered as an adjunct to the bombardier training apparatus above mentioned. Where bombardiers alone are to be trained, this latter pilot training apparatus may be completely dispensed with without disturbing the normal functioning of the bombardier's training apparatus, and where it is desired that coordinated training of pilots and bombardiers shall take place the present apparatus may readily be installed with little, if any, modification of the original bombardier training apparatus.

When the bombardier training apparatus is not equipped with the present pilot station, the bombardier, in manipulating his bombsight and the other instruments furnished him, has the ability to control the motion picture projector associated with the trainer to direct the movement of a photographic map and thus, in effect, steer the airplane. According to the present invention, where the pilot station is included, the pilot has the ability to steer the projector to control the movement of the photographic map to the exclusion of the bombardier.

Additionally, the pilot station is provided with an artificial horizon and bank indicator designed to simulate the usual gyro instrument of this type, and also a ball bank indicator, together with a conventional control stick and wheel, rudder pedals and elevator trimmer control mechanism, the operation of which serves to actuate the above mentioned indicator instruments.

The pilot station is also equipped with various other devices, such as airspeed instruments, throttle controls, temperature instruments, etc., but the present invention is primarily concerned with the artificial horizon indicator and ball bank instruments mentioned above and with the controls therefor.

It is among the objects of the present invention, in a training apparatus of the character outlined above, to provide an artificial horizon instrument and ball bank indicator instrument which are operatively connected together in a novel manner so that they may be controlled in common upon manipulation of the conventional pilot's instrument by the student pilot.

Another object of the invention is to provide additional control means which are at the disposal of the student pilot for effecting certain other controls simultaneously with the control of the artificial horizon and ball bank indicators. Such additional controls may, for example, be control of the motion picture projector associated with the trainer of the above mentioned Daly application or, in fact, control of any other mechanism.

Other objects of the invention will be pointed out in the following description and claims and illustrated in the accompanying drawing, which discloses, by way of example, the principle of the invention and the best mode, which has been contemplated, of applying that principle.

In the accompanying single sheet of drawing forming a part of this specification the figure is a schematic view, partly mechanical and partly electrical in its disclosure, showing a pilot's control station including an artificial horizon indicator and a ball bank indicator, together with various mechanical and electrical control instrumentalities therefor.

In the figure, which is entirely schematic in its representation and partly mechanical and partly electrical in its nature, there are shown various elements, assemblies and phases of the invention spread out, so to speak, in the drawing, together with the means whereby these elements are connected together electrically or mechanically, as the case may be, to effect an operative structure. No attempt has been made to show the building construction of the above mentioned Daly application in which the trainer apparatus is enclosed, and consequently the various elements and assemblies are portrayed without mechanical support therefor. To facilitate the description and render the operation of parts clearly understandable, an expedient has been resorted to wherein such elements as are fixed in their relationship relative to each other and to the supporting structure of the entire trainer have applied thereto the common electrical symbol for ground which in each instance has been labeled G. Where such stationary structures are relatively large, as for example, where the support for a motor base is concerned, a series of vertical lines projecting downwardly from the supported structure have been employed and are also labeled G. Such lines are intended to indicate that the element or mechanism directly thereabove is a stationary structure.

A pilot's artificial horizon and bank indicator 18 is shown in detail at the upper left-hand corner of the figure, while a ball bank indicator is shown at 24. The apparatus involves in its general organization a dial face 30, including an outer stationary ring 32 and an inner rotatable disc 34 having an indicating pointer 36 thereon. The disc 34 is of arcuate design in vertical cross section and has a relatively long radius of curvature. The pointer 36 is designed for cooperation with a plurality of indicia marks 38 provided on the ring 32 for indicating degrees of tilting of the airplane. The dial face 30 also has associated therewith a horizontal stationary reference indicator 40 which is designed to simulate the position of the airplane relative to a movable artificial horizon 42 which is of straight-line configuration and which spans the disc 34. The indicator 40 is carried at the upper end of a vertical support 44 integrally formed with the ring 32 and which projects upwardly from the central lower regions of the latter.

The artificial horizon 42 is adapted to be moved relative to the airplane indicator 40 in the usual manner of corresponding elements which are associated with a conventional gyroscopic artificial horizon and bank indicator as actually employed in a combat airplane to indicate the attitude of the airplane in flight.

The artificial horizon 42 is actuated under the control of an electric motor M having a shaft 50 on which there is mounted a worm 52 that meshes with a worm wheel 54 carried on a horizontal rock shaft 56 which passes through a stationary bracket 58 and on the forward end of which the disc 34 is centrally mounted. The motor M is of the direct current reversible type, that is to say, the direction of rotation of its drive shaft 50 is adapted to be reversed when the polarity of its armature current is reversed.

The shaft 56 carries at its rear end a yoke member 61 having yoke arms 63 and 65 associated therewith. The artificial horizon 42 extends across the dial face 30 at right angles to a rearwardly extending rod 60 with which it is integrally formed. The rod 60 is turned laterally as at 62 and this lateral portion thereof is rotatably carried by the yoke arms 63 and 65 near the outer ends thereof. Attached to the laterally turned portion 62 of the rod 60 at a point medially between the two yoke arms 63 and 65 is a rearward offset extension 66 which normally occupies a position in alignment with the axis of the shaft 56 when the artificial horizon 42 is in its normal central position immediately behind the airplane indicator 40 and, consequently, when the airplane is in level flight.

Both the bracket 58 and the pivotal point of support for the shaft 56 at the rear end thereof are fixed and, as a consequence, it will be seen that the unitary structure consisting of the artificial horizon 42, the rod 60, its laterally turned portion 62 and the offset extension 66 is universally tiltable bodily in such a manner as to have two components of tilting motion. This unit may tilt axially about the fixed axis of the shaft 56 under the influence of the yoke 61 in such a manner as to cause the artificial horizon 42 to become inclined to the right or the left. In so tilting the artificial horizon which is connected to the shaft 56 through the yoke 61 follows the turning movements of the dial face 30 which is fixedly mounted on the front end of the shaft 56. The unit is also capable of tilting movement about the transverse axis of the yoke 61, and when such tilting movement is resorted to the artificial horizon 42 will swing above or below the level of the airplane indicator 40 at the center of the dial face 30. In this manner, the position or attitude of the airplane in flight, relative to the true horizon, will be indicated on the dial face 30 by the movement of the artificial horizon thereof relative to the stationary airplane indicator 40. Inasmuch as the rotary shaft 56 is attached to the center of the disc 34, and inasmuch as there is a connection between the shaft 56 and the artificial horizon 42, the movements of the indicator 36 on the disc 34 and of the horizon will coincide and the indicator will, with reference to the indicia 38, indicate the degree of tilting movement of the airplane at any particular instant in flight.

The extreme rear end of the offset extension 66 has secured thereto one end of a control wire or cable 68, this latter cable passes beneath a pulley 70 and leads to an airspeed shaft 72 which is actuated under the control of a motor M1 in a manner that will be set forth presently. The airspeed shaft 72 and motor M1 are shown at the lower right-hand corner of the figure. A coil spring 71 is attached to the rear end of the offset extension 66 and serves to bias this extension upwardly against the pulling action of the cable 68.

It will be seen from the above description that as the shaft 50 of the motor M rotates in one direction or the other, the worm wheel 54 under the influence of the worm 52 will be correspondingly rotated to rock the shaft 56 in either direction. Turning movement of the shaft 56 in a counter-clockwise direction, as viewed in Fig. 2, will serve to incline the yoke 61 in the same direction, thus causing the rod 60 to be swung downwardly about the axis of the shaft 56 and yoke 61. Such movement of the rod 60 will cause the artificial horizon 42 to be tilted in a counter-clockwise direction relative to the stationary airplane indicator 40. The effective axis of tilting movement of the artificial horizon 42 will remain stationary and the only component of motion imparted to the artificial horizon will be one of tilting movement. Similarly, turning movement of the shaft 56 in a clockwise direction will cause swinging movement of the rod 60 upwardly about the axis of the shaft 56 so that the artificial horizon 42 will be tilted in a clockwise direction without varying its effective or overall elevation relative to the airplane indicator 40.

For elevational movements of the artificial horizon 42, the entire rigid unitary assembly, including the artificial horizon 42 itself, rod 60, laterally turned portion 62 and extension 66 will swing about the axis of the laterally turned portion 62. Such a motion will, of course, depend upon the drawing in or paying out of the cable 68 as it passes beneath the pulley 70. If the artificial horizon 42 is in a horizontal position, i. e., in alignment with the airplane indicator 40, and if the end of the cable 68 is drawn downwardly, the entire artificial horizon assembly will be tilted in such a manner that the artificial horizon proper 42 will become elevated, while at the same time maintaining its horizontal position. The artificial horizon 42 is thus possessed of two components of motion, namely, a component of tilting motion about the axis of the shaft 56 and a component of elevational motion about the axis of the laterally turned portion 62. This latter component of motion causes the artificial horizon to move about an arcuate path whose radius of curvature is substantially the same as that of the radius of curvature of the disc 34. Visually, however, and for all practical purposes, the artificial horizon may be said to move in a vertical plane.

The motor M operates under the control of a pilot's wheel 74, which is mounted at the upper end of a control stick 76. The control stick 76 is mounted centrally on a tiltable support 78 which is pivoted as at 80 to a stationary portion G of the apparatus. The wheel 74 is mounted upon a shaft 82 that extends through a bearing head and housing 84 positioned at the upper end of the control stick 76. The shaft 82 has associated therewith a bank control contact and rheostat assembly 86, which in actual practice is suitably located within the housing 84. For convenience of illustration, however, in the present instance this assembly is shown schematically externally of the housing 84.

The bank control contact and rheostat assembly 86 involves in its general organization a bank control rheostat 88, the movable arm 90 of which is movable with the shaft 82. The rheostat and contact assembly also includes a contact assembly 92, the contacts of which are, together with the motor M, arranged in an electrical circuit, the nature of which will be described presently. The contact assembly 92 operates under the control of a cam 94 which rotates with the shaft 82.

The wheel 74 is adapted to be biased in such a manner that it will always be returned to a neutral or center position, and toward this end, it has associated therewith a double acting loading and centering spring assembly 96. The wheel 74 also has associated therewith a shock absorber assembly 98, the function of which is to create a friction drag upon the movements of the wheel 74 to prevent extreme freedom of movement of the wheel 74. The nature of the loading and centering spring assembly 96 and the shock absorber assembly 98 is such that the pilot, when operating the wheel 74, will to a marked degree obtain the same feel that is encountered when the airplane is in actual flight. In actual flight the tendency of the wheel 74 is to center itself under the influence of air pressure acting against the ailerons and this phenomena is substantially duplicated by the resistance of the double acting loading and centering spring assembly 96. The two assemblies just described, namely, the loading and centering spring assembly 96 and the friction drag shock absorber assembly 98, are in actual practice installed at a suitable location beneath the control stick 76. For convenience of illustration in the present instance, however, they are shown immediately behind the bearing head and housing 84, for in this manner their function may readily be perceived.

The electrical circuit for the motor M is such that when the pilot operates the wheel 74 in such a manner as to simulate a right bank, for example, the artificial horizon 42 associated with the indicator 18 will be inclined in a counter-clockwise direction relative to the stationary airplane indicator 40. The reverse is true when a left bank is encountered. The electrical arrangement of the rheostat 88 and of the contact assembly 92 is such that the movements of the artificial horizon 42 is cumulative during either a right bank or a left bank. In other words, as the wheel 74 is turned from its center or neutral position in one direction or the other, the artificial horizon 42 will commence to tilt in a commensurate direction and will continue to tilt as long as the wheel 74 remains away from its center position. The rapidity with which the artificial horizon 42 becomes tilted, or, in other words, its rate of tilting movement, is dependent upon the extent to which the wheel 74 is turned in either direction. The function of the rheostat 88 is to control the amount of current flowing through the armature of the motor M in either direction. After a right or left bank has been effected and the wheel 74 restored to its center or neutral position, the artificial horizon 42 will remain in the position to which it has been moved until such a time as it is restored by turning of the wheel in the opposite direction beyond its center position to reverse the direction of rotation of the motor shaft 50.

Toward these ends, the motor armature is connected by a pair of lead wires $a$ and $b$ to the center contacts $Cm1$ and $Cm2$ associated with a pair of contact sub-groups 92' and 92'' associated with the contact assembly 92. The contact sub-groups 92' and 92'' are single pole, double throw contact groups, the former including individual contacts C1 and C3 and the latter including individual contacts C2 and C4. The contacts C1 and C4 are electrically connected to a source of current supply S by means of a common lead wire $c$. The contacts C2 and C3 are electrically connected by means of a common lead wire $d$ to the movable arm or wiper 90 of the rheostat 88, while the resistance element of this rheostat is connected by means of a lead wire $e$ to the source S. The cam 94 is designed with a raised portion 100 and an inwardly offset portion 102, these two portions of the cam merging together at a point 104 representing a neutral position of the cam. The cam 94 has associated therewith a cam follower or finger 106 which serves to simultaneously shift the positions of the center contacts $Cm1$ and $Cm2$ to reverse the direction of current flow through the armature of the motor M. When the finger 106 rests upon the neutral position 104 of the cam 94, both of the contacts $Cm1$ and $Cm2$ will remain out of engagement with their respective counterpart contacts C1, C3 or C2, C4 respectively. Thus, when the wheel 74 is turned to the right, i. e., in a clockwise direction, the contact $Cm1$ is moved into engagement with the contact C3 and the contact $Cm2$ is moved into engagement with the contact C4 so that current will flow from the positive side of the source S through wire $c$, contact C4, contact $Cm2$, wire $b$, armature of the motor M, wire $a$, contact $Cm1$, contact C3, wire $d$, and rheostat 88 to the negative side of the source S. Such flow of current through the armature of the motor M in this direction will cause rotation of the motor shaft 50 to occur in a corresponding direction. When the wheel 74 is turned to the left, i. e., in a counterclockwise direction, the finger 106 riding against the cam 94 will cause the contacts $Cm1$ and $Cm2$ to engage the contacts C1 and C2 respectively, and current may then flow from the positive side of the source S through the wire $c$, contact C1, contact $Cm1$, wire $a$, the armature of the motor M, wire $b$, contact $Cm2$, contact C2, wire d, the rheostat 88, to the negative side of the source S. Current flowing through the circuit in this direction will cause the shaft 50 of the motor M to rotate in the opposite direction. After each bank to the left or right, as the case may be, has been executed by the pilot and the wheel 74 restored to its normal position, the cam follower or finger 106 will engage the neutral position 104 of the cam 94 and the contacts $Cm1$ and $Cm2$ will be restored to their neutral positions out of engagement with their respective counterpart contacts C1, C3 or C2, C4, as the case may be, so that all current to the motor armature is interrupted. The artificial horizon 42 will thus remain stationary in whatever position it has assumed immediately prior to restoration of the various parts to their neutral positions.

In stabilized flight, airspeed is in part controlled by the attitude of the airplane, or, in other words, by the position of the airplane with respect to the horizon. In the present training apparatus, since the photographic image is moved relative to the pilot, the reverse is the case and airspeed must be controlled and caused to affect the airplane's attitude as indicated on the instrument 18. Thus, inclination of the control stick 76 forwardly away from the pilot will cause the artificial horizon 42 to rise vertically relative to the stationary airplane indicator 40. Similarly, tilting of the control stick 76 in the opposite direction, by moving the same rearwardly toward the pilot, will operate to cause the artificial horizon 42 to move downwardly relative to the stationary airplane indicator 40. To accomplish these ends, the cable 68 passes beneath the pulley 70, as previously described, and around a series of pulleys 108, 110, 112 and 114 and is attached as at 116 to the airspeed shaft 72.

The airspeed shaft 72 is adapted to be operatively connected to the airspeed mechanism of the trainer and is provided with a threaded portion 118 which passes centrally through a gear 120 in threaded relationship relative thereto. The gear 120 meshes with a worm wheel 122 which in turn meshes with a worm 124 carried on the motor shaft 126 of the airspeed motor MI. The airspeed motor MI is of the direct current reversible type and its armature is disposed in an electrical circuit which operates under the control of a rudder mechanism, the nature of which will presently be described. The airspeed shaft 72 is adapted upon rotation of the motor shaft 126 in one direction or the other to be shifted axially in one direction or the other to cause shifting of the cable 68 and consequent elevation or lowering of the artificial horizon 42 of the artificial horizon and bank indicator instrument 18. Thus, when the motor shaft 126 is rotated in such a direction as to cause the airspeed shaft 72 to shift axially to the right, as seen in Fig. 2, the cable 68 will be moved in such a direction as to draw the extreme rear end of the offset extension 66 associated with the artificial horizon 42 downwardly, thus tilting the artificial horizon assembly in such a direction as to cause elevation of the artificial horizon proper 42. Similarly, shifting movement of the shaft 72 in the opposite direction will cause a lowering movement of the artificial horizon proper 42.

The airspeed shaft 72 is connected through a double acting spring assembly 128 to a link 130 which is pivoted as at 132 to a stationary part G of the apparatus for swinging movement in a vertical plane. The link 130 is connected by means of a second link 134 to a shock absorber assembly 136 similar to the shock absorber assembly 98. The upper end of the link 130 is clamped as at 138 to a control cable 140, which passes around a series of pulleys 142, 144 and 146 leading to the airspeed take-off mechanism at the instructor's panel, by means of which the movement of the altimeter drum of the training apparatus is controlled.

The airspeed motor MI is reversible under the control of a motor reversing contact assembly 150, which is similar in its function to the contact assembly 92 and which operates under the control of the pilot's control stick 76. Accordingly, the tiltable support 78, which is pivoted as at 80 to a stationary portion of the apparatus, has mounted thereon a double acting spring assembly 152 which is connected as at 154 to the short arm 155 of a bell crank lever 156 having a depending long arm 158, the lower end of which carries a pair of pulleys 160 and 162. A trimmer control cable 164 has one end thereof clamped as at 166 to a stationary portion of the apparatus and this cable passes around the pulley 162, around a stationary pulley 168, a pulley wheel 170 associated with the contact assembly 150 and additional stationary pulleys 172 and 174 and from thence around the pulley 160 and the other end thereof is clamped as at 176 to a stationary portion of the apparatus. It will be seen that tilting movement of the pilot's control stick 76 either forwardly or rearwardly will serve to shift that portion of the control cable 164 extending between the pulley 174, around the pulleys 170 and 168 to the pulley 162 in one direction or the other. In other words, that portion of the cable 164 which passes around the pulleys 172 and 168 and over the pulley wheel 170 will be shifted and the slack that would ordinarily exist between the pulley 174 and clamping member 176 will be taken up between the pulley 168 and the clamping member 166. A control stick loading shock absorber assembly 178 serves to dampen the free swinging movement of the control stick to assist in simulating practical conditions of actual flight.

The motor reversing contact assembly 150 is in the form of a plurality of four sector-like contact plates $p^1$, $p^2$, $p^3$ and $p^4$ which are suitably secured to the pulley wheel 170. The contact plates $p^1$ and $p^3$ are designed for cooperation with a contact finger $m^3$, while the contact plates $p^2$ and $p^4$ are designed for cooperation with a similar contact finger $m^4$. The contact fingers $m^3$ and $m^4$ are carried at the opposite ends of a cross head 182 mounted centrally on a shaft 184 extending centrally from and rotatable with the worm wheel 122. The contact fingers $m^3$ and $m^4$ are electrically connected by lead wires $h$ and $k$ to the armature of the motor MI. Contact plates $p^1$ and $p^4$ are electrically connected by flexible lead wires $l$ and $m$ to the positive side of the current source B, while the contact plates $p^2$ and $p^3$ are electrically connected by flexible lead wires $o$ and $p$ to the negative side of the source B. The wires $l$, $m$, $o$, and $p$ make their connection to their respective contact plates by means of suitable stationary brushes or the like 186.

The electrical circuit for the motor MI just described is such that a follow-up motion is obtained, wherein when the control stick 76 is moved forwardly in such a manner as to simulate a dive, the double acting spring assembly 152 will be moved downwardly, thus swinging the long arm 158 of the bell crank lever 156 to the right and causing a portion of the cable 164 to shift in such a direction as to cause the pulley wheel 170 to turn in a counter-clockwise direction, as viewed in the drawings. Such turning movement of the pulley wheel will cause the contact fingers $m^3$ and $m^4$ to electrically engage the contact plates $p^3$ and $p^4$ respectively, thus sending current through the armature of the motor MI in such a direction as to cause the motor shaft 126 and associated elements to move and in turn cause the cross head 182 to turn in the same direction as the pulley wheel 170 until such a time as the contact fingers $m^3$ and $m^4$ are restored to their neutral position, whereupon current through the motor armature is interrupted and the motor is caused to stop. It is obvious that the extent of rotation of the cross head 182 will be commensurate with the extent to which the control stick 76 has been moved forwardly. Obviously, the reverse of the action just described obtains when the control stick 76 is pulled rearwardly.

Upon forward movement of the control stick 76, and consequent counter-clockwise rotation of the cross head 182, the airspeed shaft 72 will, by virtue of its threaded portion 118, be moved to the right, as viewed in Fig. 2, thus drawing in upon the cable 68 at this point to cause the extension 66 associated with the artificial horizon and bank indicator 18 to be moved downwardly so that the artificial horizon proper 42 will be moved upwardly. Obviously, by similar reasoning, rearward movement of the control stick 76 will cause the artificial horizon 42 to be moved downwardly.

The tiltable support 78 has connected thereto a control stick centering and loading spring assembly 188, the position of which may be adjusted by means of a trimmer wheel 190 operating through a flexible cable connection 192 leading to a threaded rod 194 which passes through a block 196 carried at one end of a lever 198 which is pivoted medially of its ends. The loading spring assembly 188 is pivotally connected to the lever 198 at the other end thereof. The trimmer wheel 190 is provided for the purpose of adjusting the center position of the control stick 76.

The ball bank indicator instrument 24 is diagrammatically illustrated in Fig. 2 and in the form shown comprises a dial face 200 having an arcuate slot 202 formed in the lower regions thereof and through which there is visible a disc 204 which is mounted on the lower end of an arm 206 which is pivoted as at 208 for swinging movement about a horizontal axis. This instrument is designed to simulate the conventional turn and ball bank indicator used in actual practice and which depends for its operation upon the action of gravity acting upon weighted steel or other ball which travels in an arcuate path, and which is designed to assist the pilot in determining the proper degree of bank for any particular degree of turn undertaken by him.

Since the proper amount of bank, i. e., the degree of tilting movement of the airplane, is dependent upon the desired degree of turning movement away from a straight line course, it is obvious that the degree of swinging movement of the arm 206, and consequently the displacement of the disc 204, will be a function of the extent of inclination of the artificial horizon 42. Furthermore, since in actual flight the turning movement of the airplane, exclusive of banking operations, is controlled by means of the airplane's rudder, in the present instance displacement of the disc 204 is also a function of the movement of the pilot's rudder controls. These rudder controls, in the present instance, include a pair of left and right rudder pedals 210 and 212 respectively which are mounted on respective shafts 214 and 216 which are connected together by means of an idler gear 218. The arrangement just described is such that when the left rudder pedal 210 is moved forwardly, the right rudder pedal 212 will be moved rearwardly a commensurate amount, and vice versa. The left rudder pedal 210 is connected to its supporting shaft 214 by a pedal arm 220 to which there is attached as at 222 medially thereof a cable 224. The cable 224 passes around a pulley 226 and has an end thereof connected to a drum 228 mounted on a shaft 230 in such a manner that when the left rudder pedal 210 is moved rearwardly, torque will be applied to the drum 228 to cause the same and the shaft 230 on which it is mounted to be rotated in a counter-clockwise direction, as viewed in Fig. 2. The shaft 230 also has mounted thereon a second drum 232 to which there is attached one end of a cable 234. The cable 234 passes around a pulley 236 mounted medially on a swinging cam arm 238 which is pivoted as at 240 to a stationary portion of the apparatus above the level of the shaft 56 associated with the artificial horizon and bank indicator instrument 18. From the pulley 236, the cable 234 passes around additional pulleys 242 and 244 and has its other end secured medially as at 245 to the swinging arm 206 of the turn and ball bank indicator 24. The arm 206 is spring-biased as at 246 to take up any slack existing in the cable 234. The shaft 56 has mounted thereon a cam member 248 which cooperates with a cam follower 250 mounted medially of the arm 238. This latter arm is spring-biased as at 252 in such a manner that the follower 250 will at all times bear against the cam 248. The cam 248 is of the convolute type and is so designed that as the shaft 56 rotates in a counter-clockwise direction, as seen in Fig. 2, with the artificial horizon 42 tilting to the left, the cam follower 250 will ride inwardly on the cam toward the axis of the shaft 56. Similarly, when the artificial horizon 42 becomes inclined toward the right, the cam follower 250 will ride outwardly on the cam away from the axis of the shaft 56. Depending upon the particular direction of swinging movement of the arm 238 under the influence of the cam follower 250, a component of motion in one direction or the other will be imparted to the swinging arm 206 of the turn and ball bank indicator 24.

Such increments of motion as are applied to the swinging arm 206 of the indicator 24 by the inclination of the artificial horizon 42 in one direction or the other are adapted to be modified differentially by additional increments of motion arising from manipulation of the pilot's rudder control pedal 210. Thus, when the left rudder pedal 210 is pushed forwardly, the drum 228 will be rotated in a clockwise direction so that the drum 232 will take up the cable 234, thus pulling the arm 206 to the right, the extent of such movement, of course, being dependent upon the position of the arm 238 as controlled by the cam 248 associated with the artificial horizon and back indicator instrument 18.

Whereas in actual flight an airplane turns relative to the earth, which is considered fixed, in the trainer both the bombardier's compartment and the pilot's station are stationary structures and to simulate a turn the photographic plate of the projector must be turned to cause the image on the screen to turn relative to the bombardier and pilot. In the present instance, such turning movement of the photographic plate in the projector is effected under the control of the pilot when he operates the wheel 74 on the control stick 76. Accordingly, a rate-of-turn switch, designated in its entirety at 260, includes a stationary contact plate 262 and a rotary wiper arm 264 carried on a shaft 266 suitably mounted for rotation about a horizontal axis. The shaft 266 has mounted thereon a pulley 268 over which there extends a cable 270, one end of which is biased by means of a spring 272 and the other end of which is attached to a third drum 274 mounted on the shaft 230. The cable 270 passes around a pulley 276 mounted near the lower end of the swinging arm 238. It will be seen, therefore, that as the swinging arm 238 is moved toward or away from the axis of the shaft 56, that portion of the cable existing between the pulley 276 and the spring 272 will be shifted in one direction or the other to cause rotation of the pulley 268, and consequently of the shaft 266 and wiper arm 264. The contact plate 262 has associated therewith a group of contacts *ce* arranged on one side of the plate and a similar group of contacts *cr* positioned on the other side of the plate, and the wiper arm 264 is movable from a neutral position selectively into engagement with the contacts of either group. The contacts *ce* are arranged in respective electrical circuits and are designed to control the operation of a series of relays (not shown) associated with the training apparatus, and by means of which the rate of speed of the motor which turns the projector photographic plate may be varied in one direction when making a left turn. Similarly, the contacts *cr* are arranged in respective electrical circuits and are designed to control the operation of a series of relays (not shown) which control the speed of turning movement of the projector plate motor in the opposite direction when a right turn is encountered. The specific nature of the electrical circuits associated with the contacts *ce* and *cr*, the circuits leading to the projector motor including the various relays, etc., form no part of the present invention and no claim is made herein to any novelty associated with the same, it being sufficient for the purposes of the present invention to state that the rate-of-turn switch 260 is an output switch controlling any desired type of electrical apparatus.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In a training apparatus of the character described, in combination, an artificial horizon indicator and ball bank indicator, the horizon indicator comprising a rock shaft mounted for turning movements about a horizontal axis, a dial face carried at the forward end of said shaft and rotatable with the shaft, a movable artificial horizon positioned in front of said dial face in close proximity thereto and spanning the same, means operatively connecting said horizon and shaft whereby turning movements of the horizon in either direction will cause tilting movements of the shaft, said ball bank indicator comprising a stationary dial face, an arm mounted for swinging movements about a horizontal axis, a visible disc carried at the lower end of said arm and cooperating with said latter dial face, and means operatively connecting said arm and rock shaft whereby movement of the shaft will cause displacement of said disc relative to said last mentioned dial face.

2. In a training apparatus of the character described, in combination, an artificial horizon indicator and ball bank indicator, the horizon indicator comprising a rock shaft mounted for turning movements about a horizontal axis, a dial face carried at the forward end of said shaft and rotatable with the shaft, a movable artificial horizon positioned in front of said dial face in close proximity thereto and spanning the same, means operatively connecting said horizon and shaft whereby turning movements of the horizon in either direction will cause tilting movements of the shaft, said ball bank indicator comprising a stationary dial face, an arm mounted for swinging movements about a horizontal axis, a visible disc carried at the lower end of said arm and cooperating with said latter dial face, a cam mounted on said rock shaft, a cam follower therefor, means normally urging said follower into engagement with said cam, and means operatively connecting said cam follower and arm whereby movements of said rock shaft and consequently of the artificial horizon will cause displacement of said disc relative to said last mentioned dial face.

3. In a training apparatus of the character described, in combination, an artificial horizon indicator and a ball bank indicator, the horizon indicator comprising a rock shaft mounted for rocking movement about a horizontal axis, a dial face carried at the forward end of said shaft and movable therewith, a movable artificial horizon positioned in front of said dial face and spanning the same, a yoke carried at the rear end of said shaft and movable therewith, means pivotally connecting said artificial horizon to said yoke whereby the horizon is capable of elevational movements relative to said dial face, means for controlling such elevational movements of the artificial horizon, said ball bank indicator comprising a stationary dial face and a movable visible disc therefor, a cam mounted on said rock shaft, a cam follower cooperating with said cam, and means operatively connecting said cam follower and disc whereby rocking movements of said rock shaft and consequently tilting movements of said artificial horizon in any predetermined elevational position of the horizon will be reflected by movements of said disc.

4. In a training apparatus of the character described, in combination, an artificial horizon indicator and a ball bank indicator, the horizon indicator comprising a rock shaft mounted for rocking movement about a horizontal axis, a dial face carried at the forward end of said shaft and movable therewith, a movable artificial horizon positioned in front of said dial face and spanning the same, a yoke carried at the rear end of said shaft and movable therewith, means pivotally connecting said artificial horizon to said yoke whereby the horizon is capable of elevational movements relative to said dial face, means for controlling such elevational movements of the artificial horizon, the ball bank indicator comprising a stationary dial face, an arm mounted for swinging movements about a fixed horizontal axis, a visible disc carried at the lower end of said arm and positioned in front of said latter dial face designed for movements thereacross upon swinging movement of said arm in either direction, a cam mounted on said rock shaft, a cam follower therefor, means normally urging said follower into engagement with said cam, a pulley mounted on said follower, a second shaft mounted for rotation about a fixed axis, a drum mounted on said latter shaft and rotatable therewith, a cable having one end thereof attached to the periphery of said drum, said cable passing over said pulley and having its other end secured to the arm of the ball bank indicator whereby movements of said rock shaft and consequently of the artificial horizon will cause displacement of said disc relative to the dial face of the ball bank indicator, and means for imparting turning movements to said drum to vary the effective length of said cable and thus cause differential movements of said disc.

JAMES M. CUNNINGHAM.

REFERENCES CITED

The following references are of record in the file of this patent:

UNITED STATES PATENTS

| Number | Name | Date |
| --- | --- | --- |
| 1,797,794 | Rougerie | Mar. 24, 1931 |
| 2,038,059 | Reichel | Apr. 21, 1936 |
| 2,164,412 | Koster | July 4, 1939 |
| 2,243,973 | Mills | June 3, 1941 |
| 2,292,451 | Koster | Aug. 11, 1942 |
| 2,306,429 | Edwards | Dec. 29, 1942 |
| 2,307,840 | MacDonald | Jan. 12, 1943 |
| 2,316,181 | Ocker | Apr. 13, 1943 |
| 2,336,711 | Barber | Dec. 14, 1943 |
| 2,366,603 | Dehmel | Jan. 2, 1945 |
| 2,373,313 | Jeandron | Apr. 10, 1945 |
| 2,381,872 | Baker | Aug. 14, 1945 |

FOREIGN PATENTS

| Number | Country | Date |
| --- | --- | --- |
| 378,172 | Great Britain | 1932 |
| 396,540 | Great Britain | 1933 |